(12) United States Patent
Xu

(10) Patent No.: US 8,582,937 B2
(45) Date of Patent: Nov. 12, 2013

(54) DUAL-RING SILICON ELECTRO-OPTIC MODULATOR

(75) Inventor: Qianfan Xu, Houston, TX (US)

(73) Assignee: William Marsh Rice University, Houston, TX (US)

(*) Notice: Subject to any disclaimer, the term of this patent is extended or adjusted under 35 U.S.C. 154(b) by 435 days.

(21) Appl. No.: 12/879,750

(22) Filed: Sep. 10, 2010

(65) Prior Publication Data

US 2011/0058765 A1 Mar. 10, 2011

Related U.S. Application Data

(60) Provisional application No. 61/241,202, filed on Sep. 10, 2009.

(51) Int. Cl.
*G02B 6/26* (2006.01)
*G02B 6/42* (2006.01)

(52) U.S. Cl.
USPC .......................................................... 385/50

(58) Field of Classification Search
USPC .......................................................... 385/50
See application file for complete search history.

(56) References Cited

U.S. PATENT DOCUMENTS

| | | | |
|---|---|---|---|
| 4,093,345 A * | 6/1978 | Logan et al. ................. | 385/2 |
| 7,751,654 B2 | 7/2010 | Lipson et al. | |
| 2009/0274413 A1 | 11/2009 | Beausoleil et al. | |

OTHER PUBLICATIONS

Qianfan Xu, "Cascaded silicon micro-ring modulators for WDM optical interconnection", Oct. 2, 2006, Optics Express, vol. 14, pp. 9430-9435.*
Xu, et al.; "Micrometer-scale all-optical wavelength converter on silicon", Optics Letters, vol. 30, No. 20, Oct. 15, 2005, pp. 2733-2735 (3 pages).
Xu, et al.; "All-optical logic based on silicon micro-ring resonators", Optics Express, vol. 15, No. 3, Feb. 5, 2007, pp. 924-929 (6 pages).
Reed, et al., "Silicon optical modulators", Nature Photonics, vol. 4, Aug. 2010, pp. 518-526 (9 pages).
Qianfan Xu, "Silicon dual-ring modulator", Optics Express, vol. 17, No. 23, Nov. 9, 2009, pp. 20783-20793 (11 pages).
Xu, et al., "12.5 Gbitls carrier-injection-based silicon micro-ring silicon modulators", Optics Express, vol. 15, No. 2, Jan. 22, 2007, pp. 430-436 (7 pages).
Xu, et al., "Silicon microring resonators wtih 1.5-micro m radius", Optics Express, vol. 16, No. 6, Mar. 17, 2008, pp. 4309-4315 (7 pages).

* cited by examiner

*Primary Examiner* — Uyen Chau N Le
*Assistant Examiner* — Kajli Prince
(74) *Attorney, Agent, or Firm* — Osha Liang LLP

(57) ABSTRACT

A device, system, and method for the electro-optic modulation of light. The device includes a substrate having a first ring waveguide and a second ring waveguide on the surface. The device includes a first p-doped region inside the first ring waveguide and a second p-doped region inside the second ring waveguide. The device includes a first n-doped region interposed between the first ring waveguide and the second ring waveguide, a second n-doped region outside the first ring waveguide, and a third n-doped region out the second ring waveguide. The device includes a first linear waveguide located on the surface adjacent to the first ring waveguide and the second ring waveguide. The device includes a fourth n-doped region on the surface located adjacent to the first linear waveguide. The device includes a control circuit configured to modulate light in the first linear waveguide using a voltage source and electrical connections.

21 Claims, 10 Drawing Sheets

DUAL-RING SILICON ELECTRO-OPTIC MODULATOR

CROSS-REFERENCE TO RELATED APPLICATIONS

This application claims priority to U.S. Provisional Application No. 61/241,202, entitled "Dual-Ring Silicon Electro-Optic Modulator," filed Sep. 10, 2009, which is hereby incorporated by reference in its entirety.

BACKGROUND

Electro-optical modulators, devices that covert an electronic signal to an optical signal and vise versa, are a key component for optoelectronic systems. In order to build large-scale integrated optoelectronic systems on a silicon chip, for example an optical interconnection system for a many-core computer chip, compact and high-speed silicon modulators with low power consumption are critical.

SUMMARY

In general, in one aspect, the invention relates to a device including a substrate having a surface with a first ring waveguide and a second ring waveguide. The device includes a first p-doped region inside the first ring waveguide and a second p-doped region inside the second ring waveguide. The device also includes a first n-doped region interposed between the first ring waveguide and the second ring waveguide, a second n-doped region outside the first ring waveguide, and a third n-doped region out the second ring waveguide. The device includes a first linear waveguide located on the surface adjacent to the first ring waveguide and the second ring waveguide. The device also includes a fourth n-doped region on the surface located adjacent to the first linear waveguide. The device includes a control circuit configured to modulate light in the first linear waveguide using a voltage source, a first electrical connection to the first p-doped region, a second electrical connection to the second p-doped region, and a third electrical connection to the first n-doped region.

In general, in one aspect, the invention relates to a system for the electro-optic modulation of light. The system includes an electro-optic modulator. The electro-optic modulator includes a substrate having a first ring waveguide and a second ring waveguide. The device includes a first p-doped region inside the first ring waveguide and a second p-doped region inside the second ring waveguide. The device also includes a first n-doped region interposed between the first ring waveguide and the second ring waveguide, a second n-doped region outside the first ring waveguide, and a third n-doped region out the second ring waveguide. The device includes a first linear waveguide located on the surface adjacent to the first ring waveguide and the second ring waveguide. The device also includes a fourth n-doped region on the surface located adjacent to the first linear waveguide. The device includes a control circuit configured to modulate light in the first linear waveguide using a voltage source, a first electrical connection to the first p-doped region, a second electrical connection to the second p-doped region, and a third electrical connection to the first n-doped region. The system also includes a temperature control circuit configured to control a temperature in the first ring waveguide and a temperature in the second ring waveguide.

In general, in one aspect, the invention relates to a device including a substrate having a surface with a first ring waveguide and a second ring waveguide. The device includes a first n-doped region inside the first ring waveguide and a second n-doped region inside the second ring waveguide. The device also includes a first p-doped region interposed between the first ring waveguide and the second ring waveguide, a second p-doped region outside the first ring waveguide, and a third p-doped region out the second ring waveguide. The first, second, and third p-doped regions do not overlap. The device includes a first linear waveguide located on the surface adjacent to the first ring waveguide and the second ring waveguide, where the first linear waveguide does not overlap with the first p-doped region. The device also includes a fourth p-doped region on the surface located adjacent to the first linear waveguide, where the fourth p-doped region does not overlap with the first p-doped region. The device includes a control circuit configured to modulate light in the first linear waveguide using a voltage source, a first electrical connection to the first n-doped region, a second electrical connection to the second n-doped region, and a third electrical connection to the first p-doped region.

In general, in one aspect, the invention relates to a system for the electro-optic modulation of light. The system includes an electro-optic modulator. The electro-optic modulator includes a substrate having a first ring waveguide and a second ring waveguide. The device includes a first n-doped region inside the first ring waveguide and a second n-doped region inside the second ring waveguide. The device also includes a first p-doped region interposed between the first ring waveguide and the second ring waveguide, a second p-doped region outside the first ring waveguide, and a third p-doped region out the second ring waveguide. The first, second, and third p-doped regions do not overlap. The device includes a first linear waveguide located on the surface adjacent to the first ring waveguide and the second ring waveguide, where the first linear waveguide does not overlap with the first p-doped region. The device also includes a fourth p-doped region on the surface located adjacent to the first linear waveguide, where the fourth p-doped region does not overlap with the first p-doped region. The device includes a control circuit configured to modulate light in the first linear waveguide using a voltage source, a first electrical connection to the first n-doped region, a second electrical connection to the second n-doped region, and a third electrical connection to the first p-doped region. The system also includes an optical detector configured to measure optically scattered light from the first ring waveguide and the second ring waveguide and a temperature control circuit configured to control a temperature in the first ring waveguide and a temperature in the second ring waveguide.

In general, in one aspect, the invention relates to a method for controlling modulation of light. The method includes measuring the optical scattering from a first ring waveguide and a second ring waveguide using an optical detector. The method also includes determining a difference between the optical scattering from the first ring waveguide and the second ring waveguide and adjusting a temperature in the first ring waveguide based on the difference.

Other aspects of the invention will be apparent from the following description and the appended claims.

DETAILED DESCRIPTION

Figure 1A:
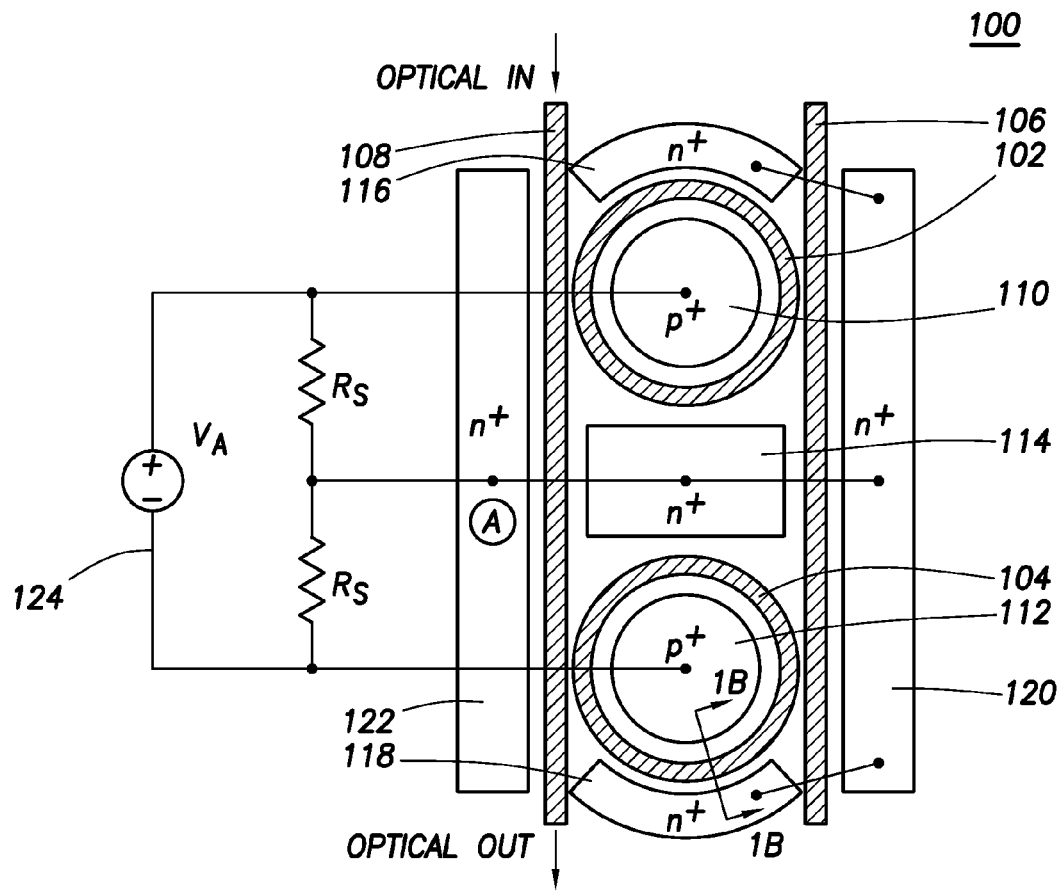
FIGS. 1A-1B show schematics of a dual ring electro-optic modulator in accordance with one or more embodiments of the invention.

Specific embodiments of the invention will now be described in detail with reference to the accompanying figures. Like elements in the various figures are denoted by like reference numerals for consistency. Further, the use of "FIG." in the drawings is equivalent to the use of the term "Figure" in the description.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the claimed invention relate to an electro-optic modulator. Specifically, embodiments of the invention relate to an electro-optic modulator that utilizes two microring waveguides (as referred to as "ring waveguides"). One or more embodiments of the invention relate to a system for the electro-optic modulation of light on a silicon chip.

One or more embodiments of the dual microring waveguide electro-optic waveguide may provide for a wide optical bandwidth, higher extinction ratio, and a low insertion loss when compared to a single microring waveguide modulator. One or more embodiments of the dual microring waveguide electro-optic waveguide may also provide for a modulation speed of greater than 40 Gbits/s.

One or more embodiments of the invention may include optical detectors for measuring the optical scattering in the individual microring waveguides and heaters for the temperature control of the individual microring waveguides. One or more embodiments of the invention may also provide a feedback signal for the automatic active control of the modulation wavelength using the optical scattering and temperature control of the individual microring waveguides.

One or more embodiments of the invention relate to a method for an automatic feedback mechanism for adjusting the temperature of each microring waveguide in the dual microring waveguide electro-optic modulator based on the detected optical scattering from the microring waveguide.

FIG. 1A shows the structure of a dual-ring modulator in accordance with one or more embodiment of the claimed invention. The shaded regions 102, 104, 106, and 108 represent silicon optical waveguides, which may sit on top of a thin silicon slab on a silicon-on-insulator (SOI) wafer. For example, the silicon slab may be 30 to 50 nm thick.

The dual-ring modulator includes a first ring waveguide 102 and a second ring waveguide 104 disposed near linear optical waveguides 106 and 108. Inside the first ring waveguide 102 is a region of the thin silicon slab that is highly doped to be p-type 110. Similarly, the second ring waveguide 112 has a region of the thin silicon slab that is highly doped to be p-type 112 is located inside the second ring waveguide 104. A first n-type doped region 114 of the silicon slab is located between the first 102 and second 104 ring waveguides. A second 116 and third 118 highly doped n-type region of the silicon slab are located outside the first 102 and second 104 ring waveguides, respectively. Also, a third 120 and fourth 122 highly doped n-type regions of the silicon slab may be located outside the first 106 and second 108 linear waveguides, respectively. A cross-section 126 of the area of the ring waveguide structure in accordance with one or more embodiments of the claimed invention is shown in FIG. 1B.

The p-type 110, 112 and n-type 114, 116, 118, 120, and 122 doped regions may be electrically connected to two integrated resistors $R_S$ via metal wires to form a circuit 124 as shown in FIG. 1A. As shown in FIG. 1B, there may also be a $SiO_2$ cladding layer 127, for example ~1 µm thick, between the doped regions and the electrical connections to avoid optical absorption from the metal wires. The device in FIGS. 1A and 1B may be fabricated using processes known in the art.

Figure 1B:
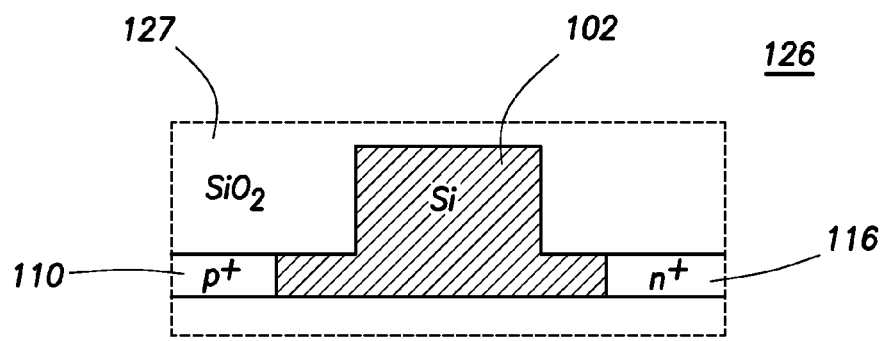

In addition, while FIGS. 1A-1B show various shapes of the doped regions, the invention is not limited to shape of the doped regions as shown in the corresponding figures; rather, the shape of the doped regions may be any shape sufficient to ensure that the inside and outside of the microring waveguides are doped with different types. In one or more embodiments of the invention most or all of the area outside and surrounding the microring waveguide is doped.

Further, in one or more embodiments of the invention, the n-type regions 114, 116, 118, 120, and 122 outside the microring waveguides 102 and 104 may be interconnected or continuous. For example, the n-type region 116 may be connected to one or both of the n-type regions 120 and 122. Similarly, the n-type region 118 may be connected to one or both of the n-type regions 120 and 122. Also, in one or more embodiments of the invention, the n-type region 114 may be connected to one or both of the n-type regions 120 and 122. In such cases, the linear waveguides 106, 108 may overlap with one or more of the doped regions. Further, the linear waveguides 106, 108 may overlap with one or more of the doped regions even in embodiments in which the n-type regions 114, 116, 118, 120, and 122 are not interconnected or continuous.

Though not shown in FIG. 1A, in one or more embodiments of the invention, the doping of the p-type 110, 112 and n-type 114, 116, 118, 120, and 122 regions shown in FIG. 1A may be reversed. In other words, the n-type 114, 116, 118, 120, and 122 doped regions may be p-type doped, and the p-type 110, 112 regions may be n-type doped.

Figure 2:
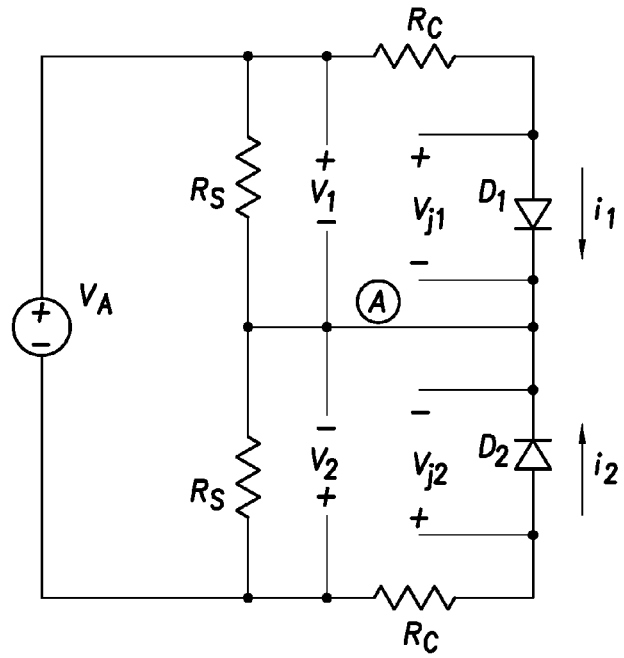
FIG. 2 shows a schematic of a circuit in accordance with one or more embodiments of the invention.

To demonstrate the operation of the device shown in FIGS. 1A and 1B, FIG. 2 shows an equivalent circuit of the device illustrated in FIG. 1A in accordance with one or more embodiments of the claimed invention. Note that all the n-doped regions in FIG. 1A are electrically connected by metal wires and form the point A in the circuit diagram of FIG. 2. The diodes $D_1$ and $D_2$ represent the first 102 and second 104 ring waveguides, respectively. Serial resistors $R_C$ are added to each junction to characterize the contact resistance between the metal connections and the doped silicon area. Accordingly, the contact resistances at both sides of the junctions may be considered. In order to obtain a fast modulation, $R_C$ needs to be much smaller than $R_S$.

Under steady state, if the applied voltage $V_A$ is positive, $D_1$ is forward biased and $D_2$ is reverse biased. The main path of electrical current goes though $D_1$ and the lower resistor $R_S$. As such, free carriers (electron-hole pairs) may accumulate inside the microring waveguide corresponding to $D_1$, and blue-shift, or shift to a lower wavelength the resonant wavelength of that microring due to the free-carrier dispersion effect. The amount of electron-hole pairs inside $D_1$ depends on the forward current through $D_1$ as $$N_1 = i_1 \cdot \tau / q \quad (1)$$

where $\tau$ is the carrier lifetime, q is the electron charge, and the current $i_1$ is set by the resistor $R_S$ as $$i_1 \approx (V_A - Vth)/(R_S + R_C) \approx (V_A - V_{th})/R_S \quad (2)$$

where $V_{th}$ is the threshold voltage of the p-i-n diode, for example ~0.7 V. Because the steady-state current required for the modulator is very small, for example on the order of 0.1 mA, the resistor $R_S$ may be as high as a few kΩ and, thus, minimize the steady-state power consumption.

Given the symmetry of the circuit, when the applied voltage $V_A$ switches from positive to negative, the circuit switches to an opposite state in which the carriers are depleted in the reverse-biased diode $D_1$ and accumulated in the forward-biased diode $D_2$. In other words, the carriers may switch from the first ring waveguide 102 to the second ring waveguide 104 shown in FIG. 1A. The switching process may be very fast because all that is needed is for the carriers originally accumulated in diode $D_1$ to move to diode $D_2$ through the low-resistance ($R_C$) path between them. When a new steady state is established, the amount of carriers in diode $D_2$ is the same as that originally in diode $D_1$. As the carriers move from $D_1$ to $D_2$, the resonant wavelengths of the first and second coupled microrings may shift in opposite directions, causing an ON/OFF optical modulation in a specific wavelength range. In contrast, a single-ring waveguide modulator, where the same carrier movement only causes the resonance of the single ring to shift, may result in a much smaller optical bandwidth with the same power consumption. An example of the carrier movement is demonstrated further with regard to FIGS. 3A-3C. Because the modulation operation may be accomplished by carriers simply swinging back and forth between the first and second microring waveguides, as opposed to a single microring waveguide where the carriers are injected externally, the modulation speed may be very fast. The speed of the carries is discussed with regard to FIGS. 3A-3C.

The dual-ring structure shown in FIG. 1A may have a transmission spectrum with a transmission peak in the center of a broader dip. The width and height of the central peak may depend on the detuning between the two rings. One of ordinary skill would recognize that such a central peak may be used for slowing and stopping of light. In one or more embodiments of the invention, the height change of the central peak may be used for amplitude modulation.

As an example, if the radii of the first and second microrings are both ~5 μm, the power coupling coefficient between the microring waveguides and the linear waveguides may be 3.6%, the intrinsic quality factor $Q_{int}$ of the two microrings may be 100,000, and without carrier injection, the resonant wavelengths of the two microring resonators may be $\lambda_{A0} = 1550$ nm and $\lambda_{B0} = 1550.35$ nm, respectively. Optical modulation may be obtained when a number of carriers, which is enough to blue-shift the resonant wavelength of one microring resonator by 0.3 nm, are driven from one microring waveguide to the other. When the carriers are in the first microring waveguide, or diode $D_1$, its resonant wavelength may blue-shift to 1549.7 nm, and the optical transmission of the device may be shown as the dashed line in FIG. 3A.

Figure 3A:
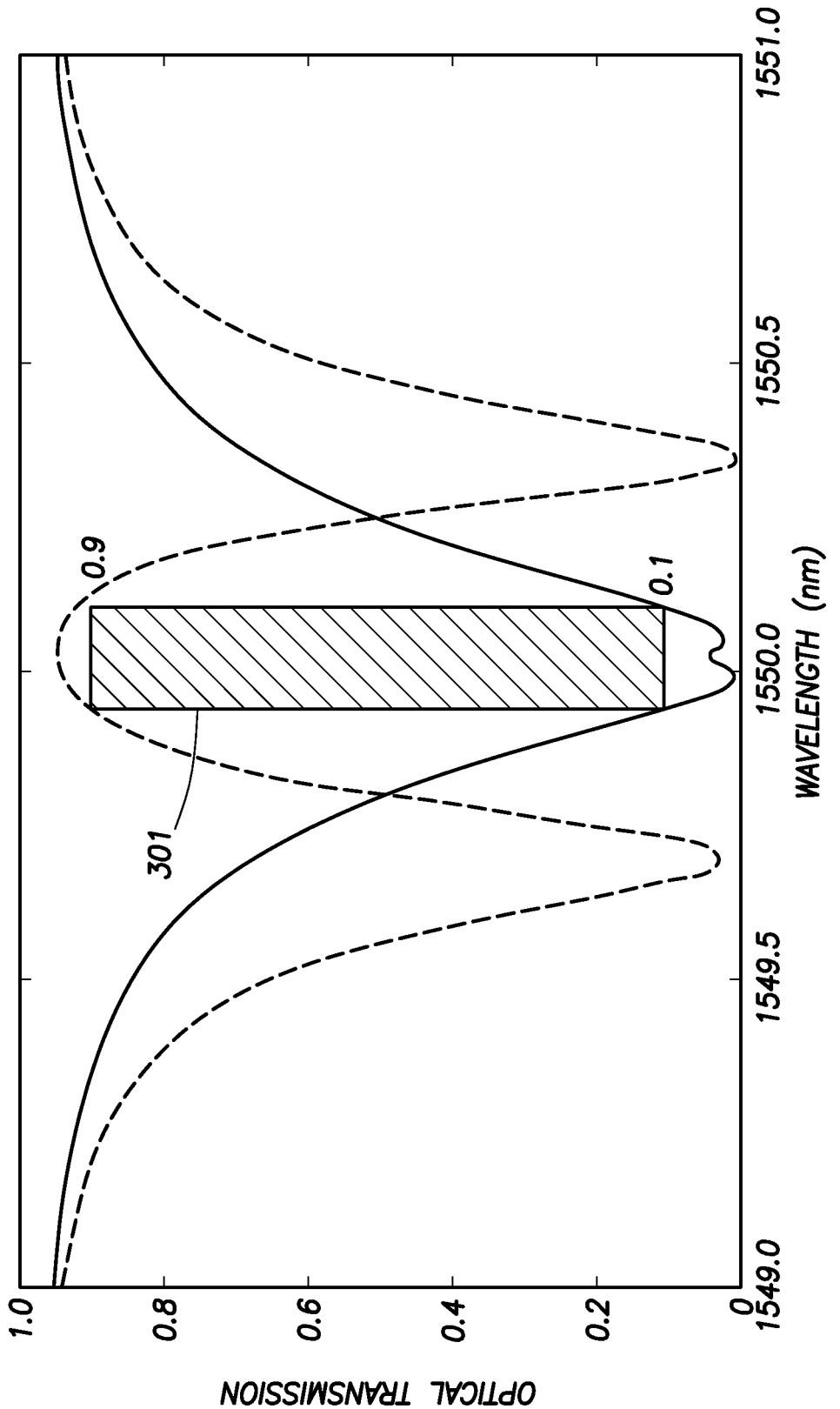
FIGS. 3A-3C show a chart of the optical and electrical characteristics of a dual ring electro-optic modulator in accordance with one or more embodiments of the invention.

When these carriers are in the second microring waveguide, or diode $D_2$, the resonant wavelength may blue-shift to 1550.05 nm and the detuning between the two microring waveguides may be reduced to 0.05 nm. The optical transmission of the device under these conditions is shown as the solid line in FIG. 3A. As can be seen in FIG. 3A, the central transmission peak at 1500 nm may almost disappear in accordance with one or more embodiments of the invention. The central peak shown in FIG. 3A may completely disappear if the detuning is further reduced to zero in accordance with one or more embodiments of the claimed invention.

In FIG. 3A, for light with wavelength within a region 301, the ON state may have over 90% transmission, corresponding to an insertion loss of less than 0.5 dB. The OFF state may have below 10% transmission, corresponding to an extinction ratio of ~10 dB. In one or more embodiments, the optical bandwidth of the modulator may be the width of the wavelength region where 10%-90% modulation (i.e. 0.1-0.9 optical transmission) may be achieved, for example, the region 301.

For the embodiment demonstrated in FIG. 3A, the optical bandwidth is 0.16 nm, while the resonance tuning necessary to obtain this bandwidth is 0.3 nm. Because the required resonance tuning is proportional to the power consumption, a figure-of-merit may be obtained as the ratio between the optical bandwidth (defined above) and the required resonance tuning. For one or more embodiments of the invention, the figure-of-merit may be 0.53, such as in the embodiment of the dual-ring modulator demonstrated in FIG. 3A.

In comparison, a single-ring modulator with a 5-μm radius may be critically coupled to a linear waveguide and have an ideal Lorentzian line-shape. While a 10%-90% modulation may be obtained, the resonance of the microring may need to be blue-shifted 0.8 nm to obtain a similar bandwidth. The bandwidth/tuning ratio may only be 0.17. Accordingly, the single-ring modulator may require three times more carriers to be driven in and out to achieve the same 10%-90% modulation. As such, three times more power consumption than the dual-ring modulator may be required for a similar optical bandwidth.

FIG. 3A also shows that dual-ring modulators may be cascaded along a single linear waveguide to form a dense-wavelength-division-multiplexing (DWDM) modulation system. While the optical transmission may change dramatically around the resonant wavelengths of the microrings, the transmission at a wavelength over 1 nm away from the central wavelength may be almost constant and close to 100%. If an adjacent wavelength channel is placed 1 nm from the central wavelength of the channel shown in FIG. 3A, 1550 nm, the modulator may only introduce a small insertion loss of 0.23 dB, and a very low inter-channel interference with only 0.05-dB modulation to the adjacent channel. One of ordinary skill would recognize that a single-ring modulator with the same bandwidth may require a much larger channel spacing to avoid significant inter-channel interference.

The circuit model shown in FIG. 2, demonstrating the dual-ring modulator shown in FIG. 1A, may be used to demonstrate the fast carrier transfer between the first and second microring waveguides. To demonstrate the carrier dynamics, the device may be modeled by the following equations.

$$dN_1/dt = i_1/q - N_1/\tau \quad (3)$$

$$dN_2/dt = i_2/q - N_2/\tau \quad (4)$$

$$v_{j1} = v_o \cdot \log[N_1 \cdot q/(I_o \cdot \tau) - 1] \quad (5)$$

$$v_{j2} = v_o \cdot \log[N_2 \cdot q/(I_o \cdot \tau) - 1] \quad (6)$$

$$i_1 = (v_1 - v_{j1})/R_C \quad (7)$$

$$i_2 = (v_2 - v_{j2})/R_C \quad (8)$$

$$v_1 - v_2 = V_A \quad (9)$$

$$i_1 + i_2 + v_1/R_S + v_2/R_S = 0 \quad (10)$$

Eq. (3)-(6) model properties of p-i-n junctions. Eq. (7)-(10) model properties of the circuits that connect the two junctions. The currents and voltages in these equations are defined in FIG. 2. $N_1$ and $N_2$ are the number of electron-hole pairs inside the first and second microring waveguides, or diodes $D_1$ and $D_2$, respectively. Eq. (1) is the steady-state solution of Eq. (3). For an ideal diode, $v_o = kT/q = 0.026$ V; however, these junctions may operate partially in a high-level-injection region where $v_o = kT/q = 0.052$ V. In the calculations presented, the numbers are obtained from fitting the experimentally measured I-V curve of a microring modulator. For example, $v_o = 0.044$ V, and $I_o = 0.28$ pA.

The dynamic behavior of the circuit may be simulated based on the above equations when assuming a non-return-to-zero (NRZ) pseudo-random bit sequence (PRBS 27-1) voltage signal at a bit rate of 40 Gbit/s is applied. As an example, in the simulation in accordance with one or more embodiments, $\tau = 1$ ns, $R_C = 80\Omega$, and RS=3 k$\Omega$. Because Eq. (5) and (6) are nonlinear, to help with the convergence of the simulation, the small reverse-bias currents of the two diodes is neglected in the simulation. In other words, it may be assumed $i_1 = 0$ when $v_{j1} < 0$ and $i_2 = 0$ when $v_{j2} < 0$.

Figure 3B:
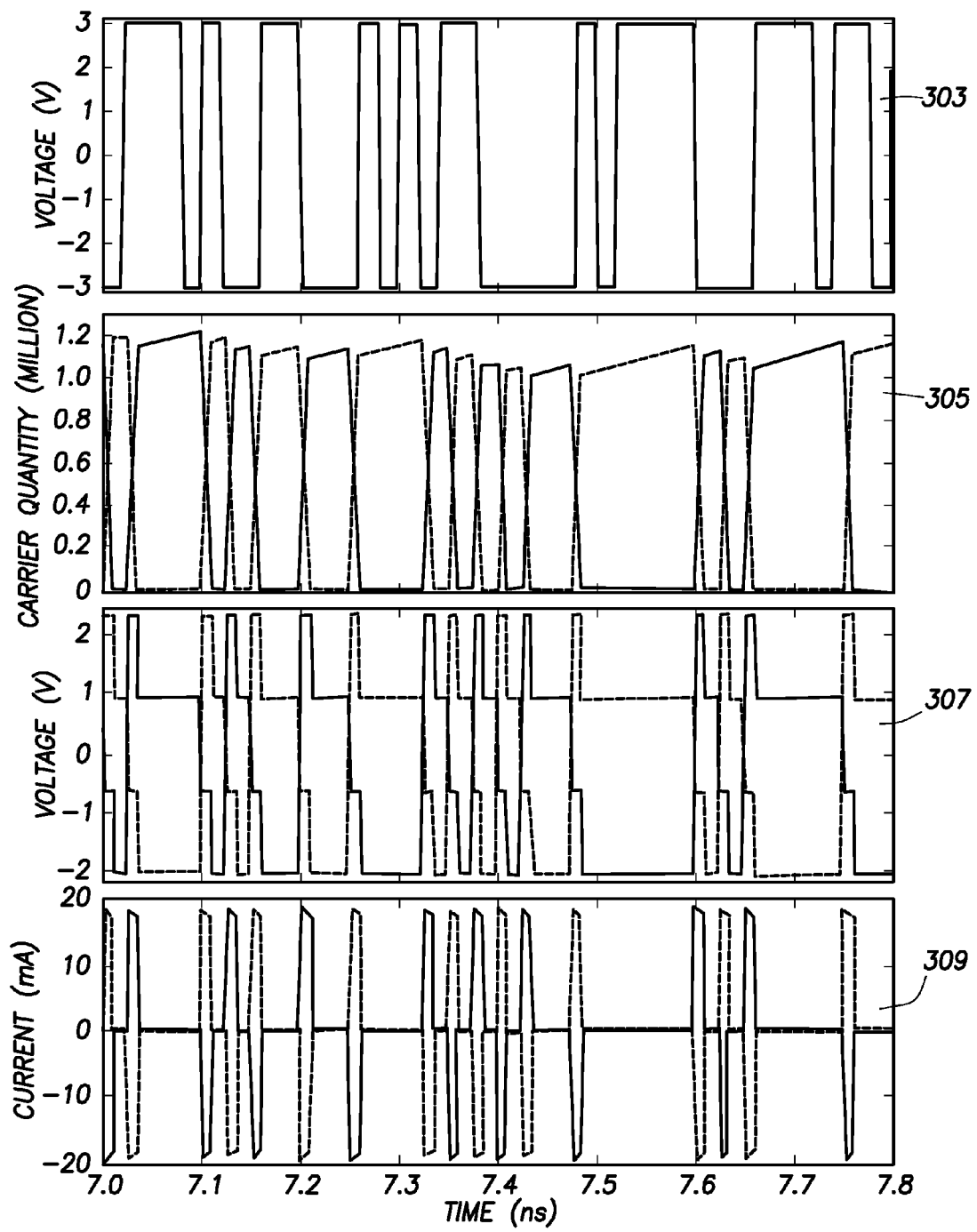

The driving voltage in accordance with one or more embodiment of the invention is shown in FIG. 3B. The waveform of the driving signal $V_A$ 303 swings between ±3 V. The number of electron-hole pairs 305 in each microring waveguide is also shown in FIG. 3B. In FIG. 3B, the solid lines refer to the carrier quantity, voltage, and current in the first ring waveguide, and the dashed lines refer to the carrier quantity, voltage, and current in the second ring waveguide. As can be seen, when the driving voltage changes, most of the carriers may be quickly driven from one ring to the other, so that the number of carriers in one ring rises while the number of carriers in the other microring drops. The transition time may be less than 10 ps. However, as evident from the FIG. 3B, a small portion of carriers may be lost in each transition, due to the current that goes through $R_S$. After the fast transition, the number of carriers may continue to rise to a steady-state value, with a time constant determined by the carrier lifetime $\tau$. The percentage of carriers lost in the transition from one microring to the other microring is proportional to the ratio $R_C/R_S$. Even though the percentage of carriers lost in each transition may be small, there may be a larger drop in the number of carriers when the transition is more frequent. Frequent transitions may create some variation of the carrier quantities in the microrings that may depend on the bit patterns. However, such a variation in the carrier quantities may only have a small effect on modulated optical output, because the optical transmission is not sensitive to the variation of carrier quantity near both the 10% and 90% transmission levels.

The total power consumption of the circuit may be calculated from the above embodiments and the above simulation to be 12 mW at 40 Gbit/s. This corresponds to an energy consumption per bit of 0.3 pJ/bit, which is an order of magnitude smaller than known silicon modulators based on Mach-Zehnder interferometers.

The fast carrier transfer process between the two microrings may also be explained as having an internal self-limiting pre-emphasis effect. When the applied voltage $V_A$ changes from positive to negative, the voltage drop on diode $D_1$ ($v_{j1}$) may remain positive before the carriers are completely depleted. Therefore, most of the negative bias voltage drops on diode $D_2$ and the contact resistance. As such, the large voltage drop is a large forward-biasing voltage for diode $D_2$ similar to that used in a known pre-emphasis scheme. This large forward-biasing voltage may result in a fast charging of diode $D_2$ and a corresponding fast de-charging of diode $D_1$. After all the carriers in diode $D_1$ are depleted, diode $D_1$ becomes reversed bias and most of the negative voltage now drops on diode $D_1$ instead of diode $D_2$. The fast charging process is stopped automatically at this point.

The voltage drops 307 and currents 309 through the two junctions are shown FIG. 3B in accordance with one or more embodiments of the invention. As can be seen, a voltage spike 307 immediately following every negative-to-positive transition drops on the small contact resistance $R_C$, and creates the current peaks 309, which may be responsible for the quick transfer of carriers between the two rings.

In the model demonstrated in FIG. 2, the transition time of the device, and thus the modulation bit-rate, may be mainly limited by the contact resistance $R_C$. The transition time may increase linearly with $R_C$. In an actual device, the transition time may also be limited by how fast the electrons and holes can physically move across the junction. This limitation is not considered in the circuit model of FIG. 2, and therefore is not reflected in the simulation results. From the saturation speed of electrons and holes in silicon, the time for the carriers to travel across the junction may be less than 10 ps, allowing for a modulation speed over 40 Gbit/s.

As the number of carriers in the two microring waveguides changes, the refractive index of silicon that forms the microring waveguide may change, due to the free-carrier plasma dispersion effect. The temporal change of refractive index may be obtained based on the carrier distribution in the two microrings, as calculated above and demonstrated in FIG. 3B. The temporal change of the refractive index may be input into a time-domain model of a dual-ring modulator, where the output optical power may be simulated assuming a continuous wave (cw) input light. Note that the frequency-domain model used above to obtain FIG. 3B assumes a time-invariant system, and so may not strictly apply, as the characteristic time of the index variation may be comparable to the photon lifetime in the device.

Figure 3C:
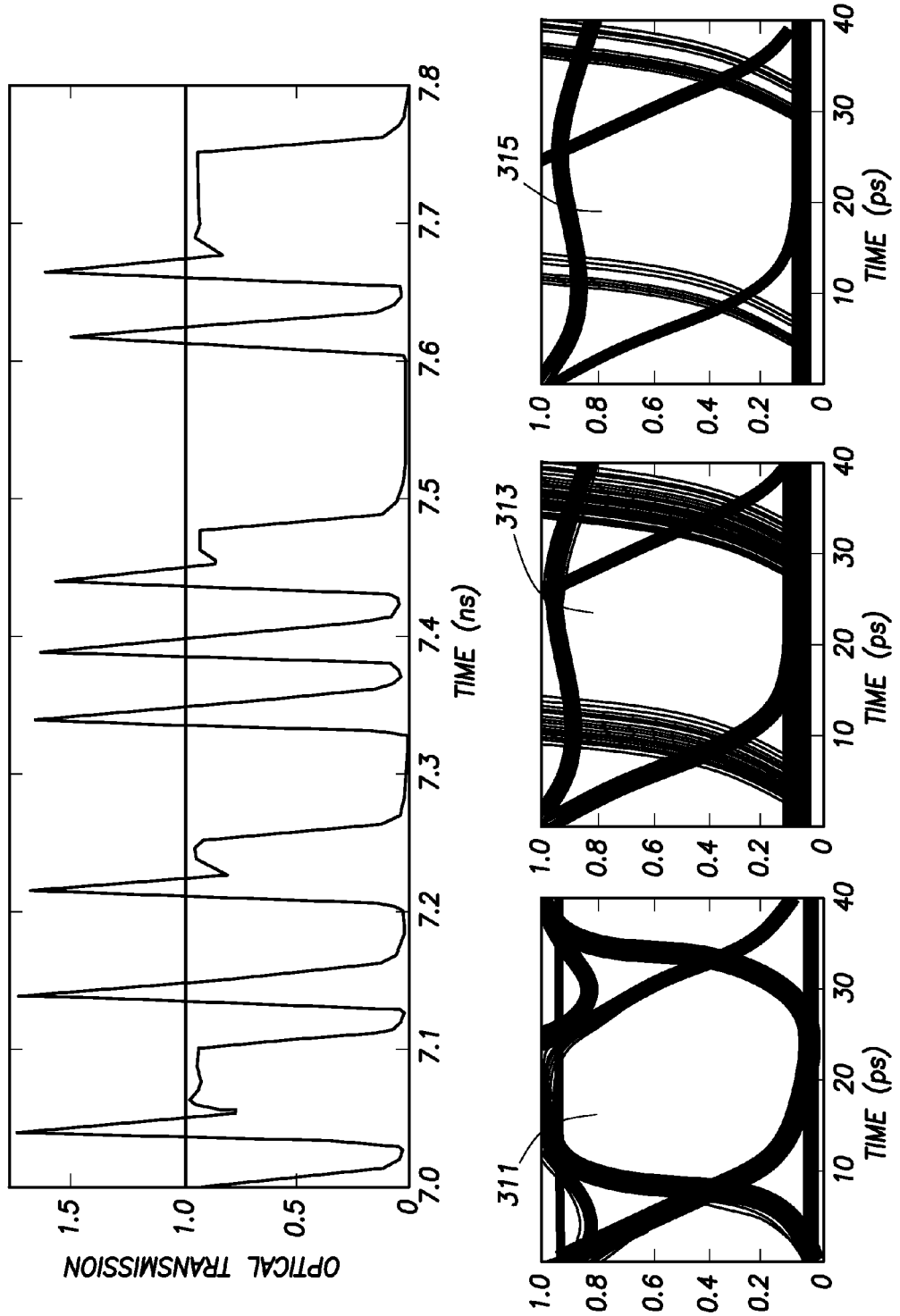

FIG. 3C shows the simulated output waveform of the modulator for light with a wavelength of 1550 nm in accordance with embodiments of the invention. FIG. 3C also shows the corresponding eye-diagram 311 of the optical output signal. As can be seen, the eyes are clearly open and 10%-90% modulation with transition time ~10 ps may be achieved.

As can be seen from the waveform in FIG. 3C, a pulse with a transmission higher than 100% appears at each leading edge of the waveform. Part of the optical energy may be stored in the dual-ring resonator when it is in the OFF state, and then released back into the output waveguide when it is switched to the ON state, causing the instantaneous output power to be higher than the input power. The extra optical power from the energy release may not significantly interfere with modulation operation.

To show the optical bandwidth of the device, FIG. 3C shows the eye-diagram at the wavelength of 1550 nm 311, the wavelength of 1549.96 nm 313, and the wavelength of 1550.08 nm 315. The bandwidth where 10%-90% modulation may be achieved may be slightly less than that measured from FIG. 3A, because the temporal dynamics are not taken into account in the frequency-domain model used to calculated FIG. 3A and because of the bit pattern dependent variation of charge quantity that may be present in the microring waveguides.

Figure 4A:
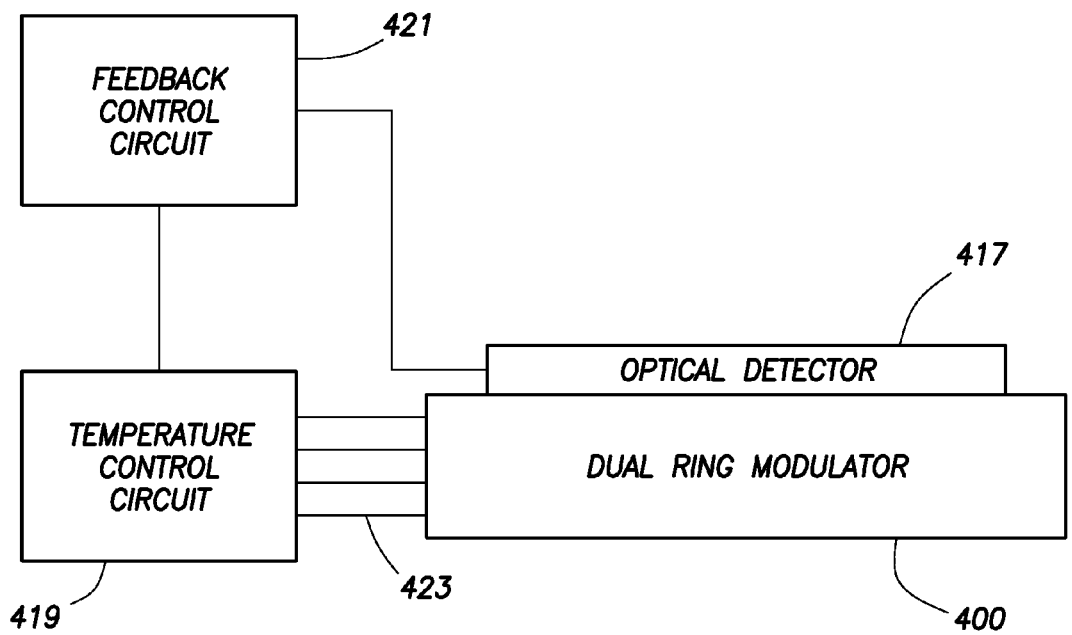
FIGS. 4A-4C show schematics of a dual ring electro-optic modulator in accordance with one or more embodiments of the invention.
Figure 4B:
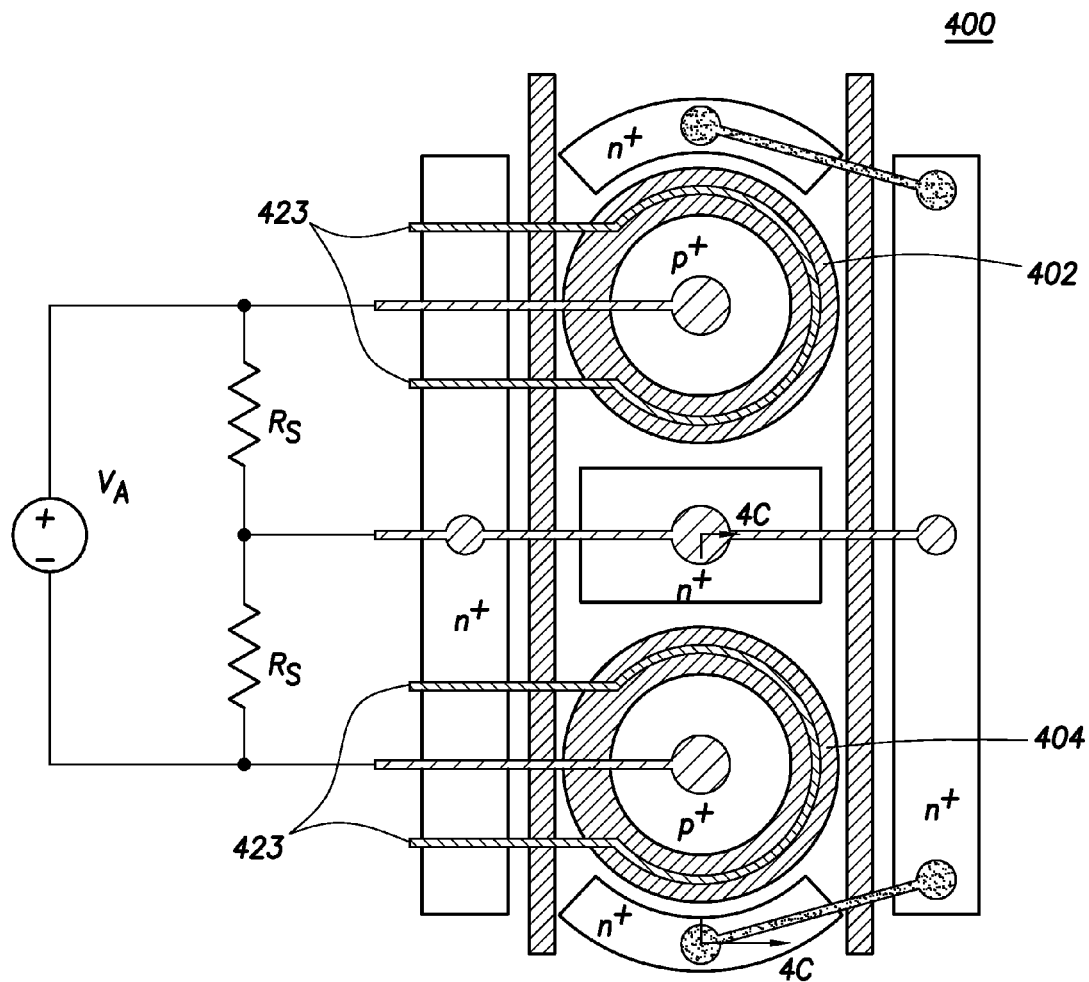
Figure 4C:
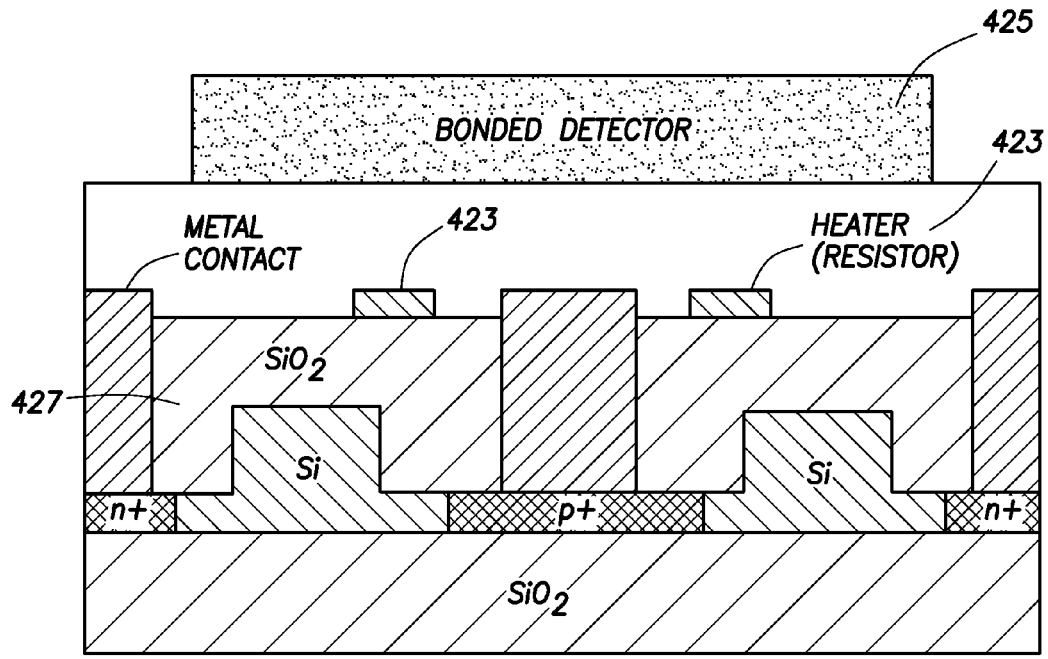

FIG. 4A-4C are schematics of a system of the dual ring electro-optic modulator in accordance with one or more embodiments of the invention. FIG. 4A shows the dual ring modulator 400 with an optical detector component 417 bonded above the microring waveguides. The optical detector component includes two optical detectors designed to measure the optical scattering from the first 402 and second 404 microrings waveguides shown in FIG. 4B, respectively. For example, a germanium detector may be integrated on top of each ring to collect the scattering light and measure the power that is averaged by many bit periods. The speed of the optical detector may be on the order of MHz, which only needs to be faster than the known micro-second thermal response time. Because the detector may have a relatively long integration time, a small portion of the scattered light may be enough to obtain a good signal-to-noise ratio for a feedback signal.

FIG. 4A also shows a temperature control circuit 419 for controlling the temperature in the first 402 and second 404 microring waveguides in accordance with one or more embodiments of the invention. In one or more embodiments of the invention, the temperature control circuit may raise or lower the temperature in one or both of the microring waveguides.

The embodiments shown in FIG. 4B are similar to FIG. 1A and include the heater connections 423. Even with the improved optical bandwidth described above, a microring waveguide modulator may only tolerate a temperature variation of ~1° C., which is below the range of temperature variation in a computer processor. Additionally, the exact dimensions of the microrings may vary from die to die and from wafer to wafer, which may cause a change in the operational wavelength of each fabricated modulator. To compensate for the environmental temperature variation and fabrication imperfections, one or more embodiments of the claimed invention include an electrical heater with an active feedback control mechanism.

FIG. 4C shows a cross-section of the dual microring electro-optic modulator in accordance with one or more embodiments of the invention. As shown in FIG. 4C, the heater connections 423 may be disposed on a $SiO_2$ cladding layer 427. The optical detector circuit 425 may be bonded directly to the dual microring electro-optic modulator in accordance with one or more embodiments of the invention.

One or more embodiments of the dual-ring modulator include a feedback signal that may be extracted with two low-speed optical detectors, which detect the light scattered from the two rings. The power of the scattered light from each ring is linearly proportional to the optical energy inside the ring, which may be determined by how far the input wavelength is from the resonant wavelength of the ring. When the input light is at the optimal operating wavelength of the modulator, which is at the center of the two ring resonances, the scattered light from the two ring waveguides should be equal.

When the wavelength of light is off the center, the microring waveguide with resonance closer to the wavelength of light will optically scatter more light than the other microring waveguide. Therefore the difference between the scattered powers of the two microring waveguides may indicate which direction to shift the two microring waveguide resonances so that the wavelength of light will be centered.

Figure 5:
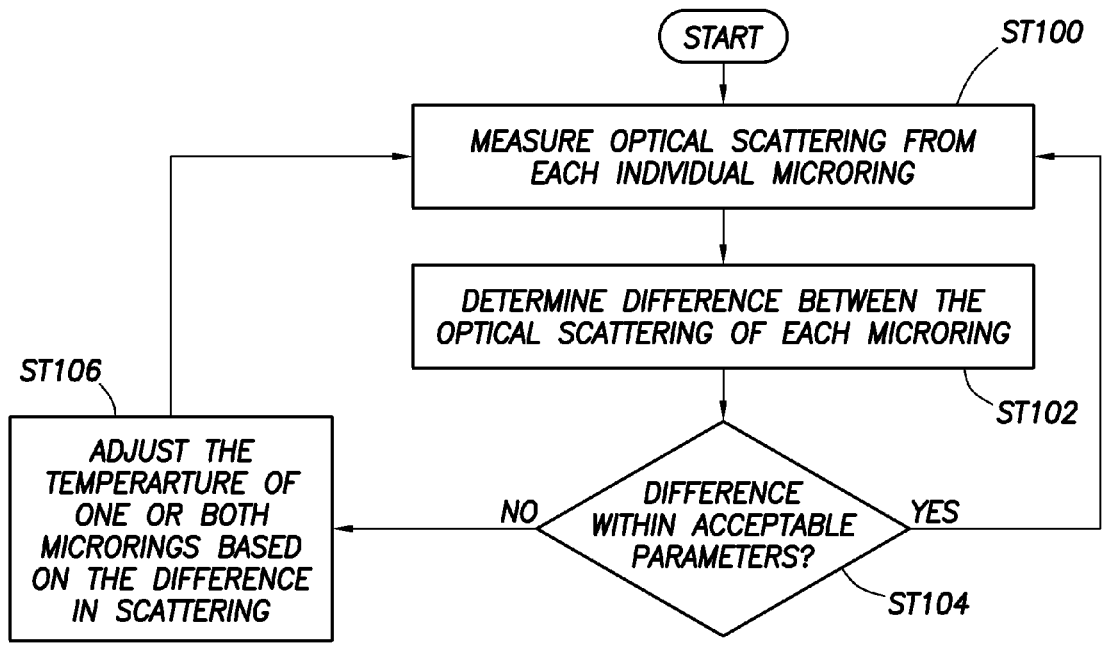
FIG. 5 shows a chart shows a flow chart of a method in accordance with one or more embodiments of the invention.

FIG. 5 is a flow chart outlining a method of a feedback mechanism in accordance with one or more embodiments of the claimed invention. In ST100 the optical scattering is measured from the first and second microring waveguides. In ST102, the difference between the time-averaged scattering power of the optically scattering light between the first and second microring waveguide is determined. As stated previously, in accordance with one or more embodiments of the invention, when the input light is at the optimal operating wavelength of the modulator, the scattered light from the two rings should be equal. Therefore, the difference of the scattered light from each microring waveguide should be at or near zero. In ST104, the difference in the scattered light from each microring waveguide is analyzed to determine if the difference is within acceptable parameters. For example, the difference may be analyzed to determine if the difference is positive or negative or if the difference is less than a particularly set value. If the difference is within the acceptable parameters, the process may return to ST100. If the difference is determined to not be within acceptable parameters, in ST106, the temperature of one or both microring waveguides may be adjusted accordingly.

The feedback mechanism described above may work even when the device is actively modulating light in accordance with one or more embodiments of the invention. The feedback mechanism may be employed while actively modulating light because the input wavelength should be at the center of the two ring resonances, for both ON and OFF state and any transitional state in between. In addition, the feedback mechanism may be continuous and automatic in accordance with one or more embodiments of the invention. For example, the magnitude of the difference in the scattering between the microring waveguides may be used to continuously adjust the temperature in the microring waveguides, based on the difference in the optical scattering.

Figure 6:
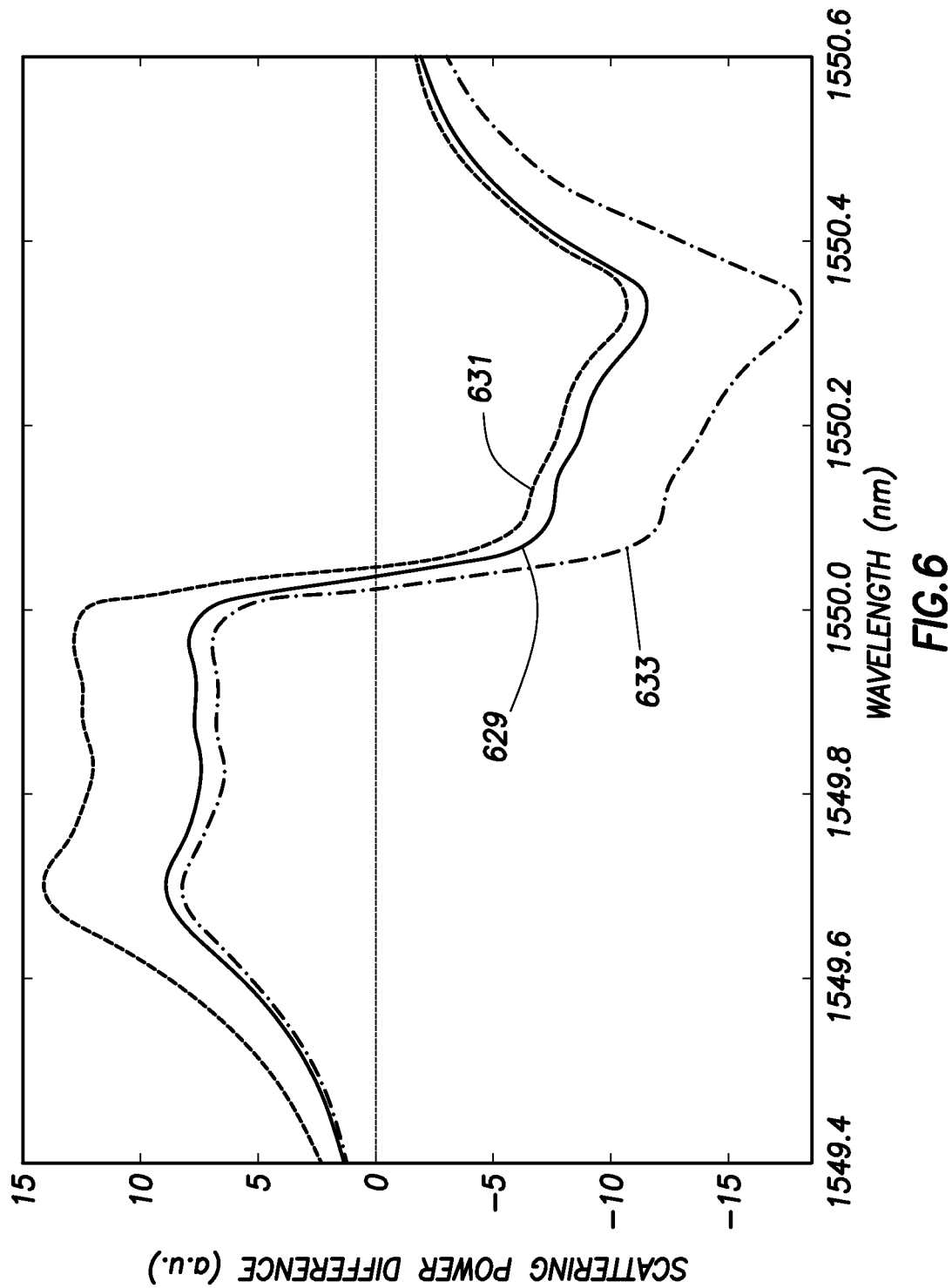
FIG. 6 shows a chart of the difference of optical scattering light from each ring in accordance with one or more embodiments of the invention.

The solid line in FIG. 6 shows the difference in the time-averaged scattered power between the two rings as a function of the wavelength of light in accordance with one or more embodiments of the claimed invention. The curves in FIG. 6 were obtained from the optoelectronic simulation assuming the dual-ring modulator is operating at the same condition as that shown in FIG. 3A-3C. As can be seen, the curve 629 crosses the zero line within the wavelength range for high quality modulation, between 1549.96 nm and 1550.08 nm and is positive on one side and negative on the other side. As such, the sign (positive or negative) of the difference in the optical scattering between the two ring waveguides may be used as a feedback signal. A simple control circuit that heats up the rings more or less depending on the sign of the feedback signal may be used to bring the difference in the optical scattering between the two microring waveguides to zero. Maintaining the difference in the optical scattering between the two microring waveguides as zero keeps the input wavelength within an optimal range.

Because the scattering of light may be mainly caused by random-distributed side-wall roughness of the rings, the scattering efficiency (the ratio between the scattered optical power and the optical energy inside the ring) may be different for the two rings. The difference, however, does not significantly affect the proposed feedback scheme. For Example, referring to FIG. 6, the simulated feedback signal when the scattering efficiency of ring $D_1$ is 50% higher than that of $D_2$ 631 and the scattering efficiency of ring $D_2$ is 50% higher than that of $D_1$ 633 is shown. As can be seen from the example, the large variation of scattering efficiency has little effect on where the feedback signal crosses zero line. Both curves 631 and 633 cross the zero line well within the wavelength range for high-quality modulation.

Because the two microring waveguides are located close to each other, the temperature difference and the relative dimensional variation may be small. As such, the detuning between the two rings may have much less variation than the absolute wavelengths of their resonances. Therefore in one or more embodiments of the invention it may be assumed that the detuning may be reproduced as designed and does not require active control.

Figure 7A:
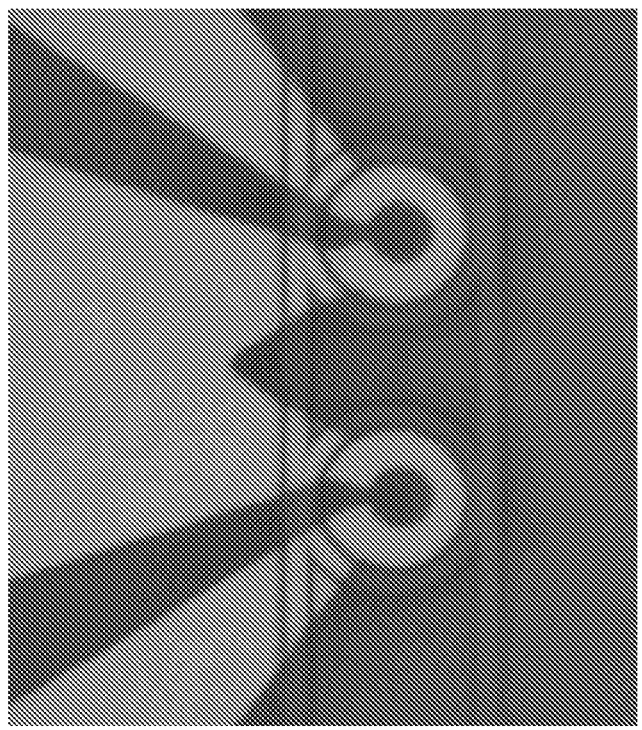
FIGS. 7A-7C show photographs of a dual ring electro-optic modulator in accordance with one or more embodiments of the invention.
Figure 7B:
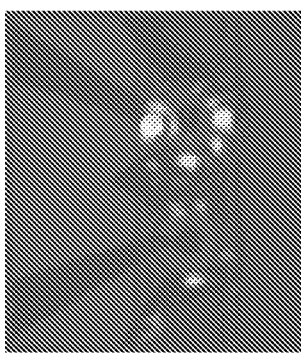
Figure 7C:

FIGS. 7A-7C are microscope images of an electro-optic dual microring modulator in accordance with one or more embodiments of the claimed invention. FIG. 7A is a microscope image of the dual microring waveguide device in accordance with one or more embodiments of the claimed invention. FIGS. 7B and 7C are microscope images of the scattering light when the carriers are in the first microring waveguide (FIG. 7B) and when the carriers are in the second microring waveguide (FIG. 7C).

Figure 7D:
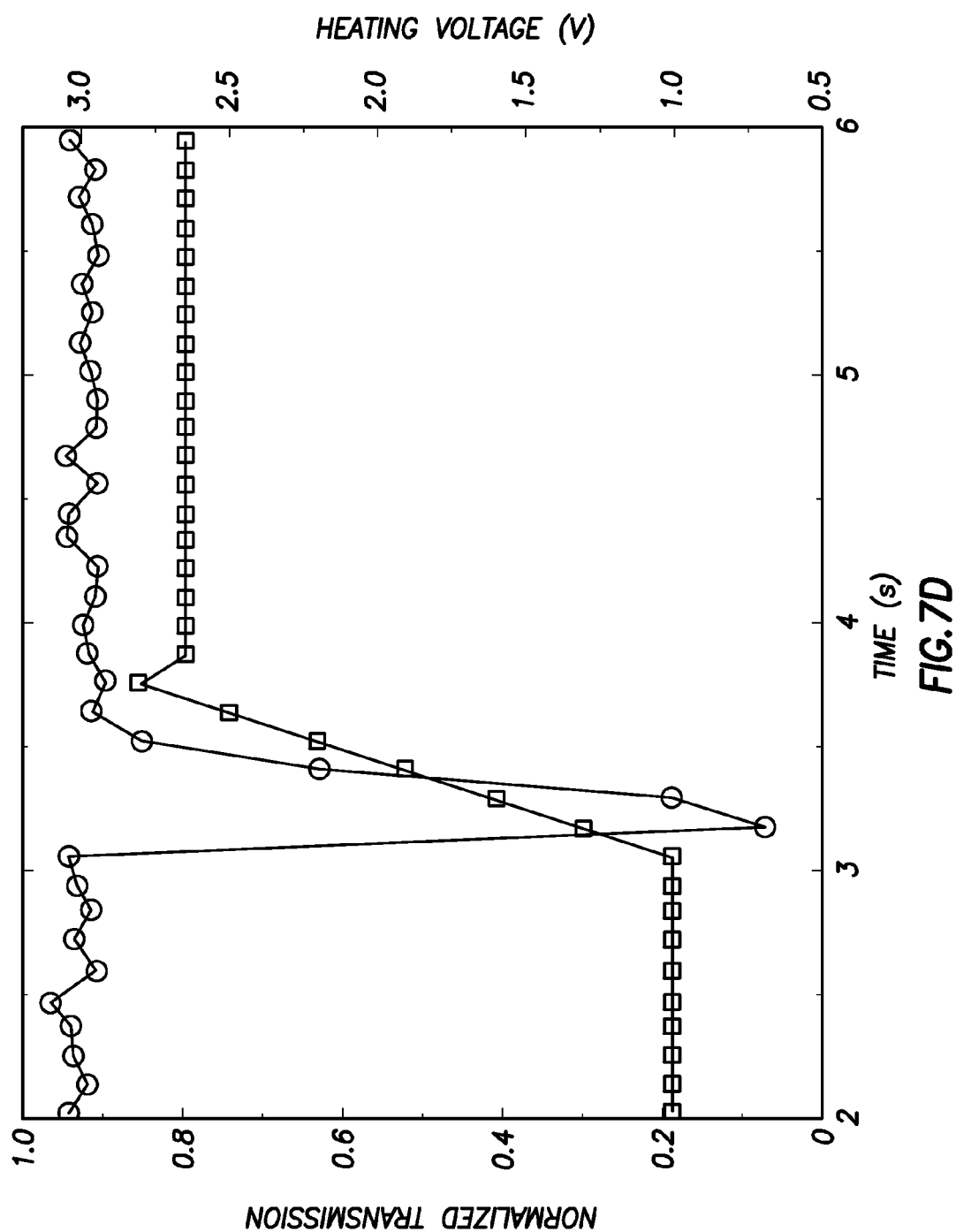
FIG. 7D shows a chart of transmission and heating voltage in accordance with one or more embodiments of the invention.

FIG. 7D is a graph of the normalized transmission at 1500 nm and heating voltage of the dual microring electro-optic modulator in accordance with one or more embodiments of the claimed invention. As can be seen, as the heating voltage is ramped up in one of the microrings, the transmission at 1500 nm of the electro-optic device drops significantly for a period of time rebounding before the heating voltage in the microring completes the ramp up. The dip in transmission indicates coupling/absorption of 1500 nm into the electro-optic dual microring device. Accordingly, in one or more embodiments of the invention, the temperature control of each of the microrings may be used, based on the optical scattering of each microring, to control the coupling/absorption in the electro-optic device.

In one or more embodiments of the invention may provide a coupled dual microring waveguide electro-optic modulator which has a three times wider optical bandwidth of high-quality modulation than the single-ring modulator with the same power consumption. Alternatively, one or more embodiments of the invention may provide a coupled dual microring waveguide electro-optic modulator which has three times less power consumption for the same optical bandwidth. A simple integrated circuit connecting the two rings may allow for a modulation of greater than or equal to 40 Gbit/s without the need for an external pre-emphasis circuit. One or more embodiments of the invention may provide a coupled dual microring waveguide electro-optic modulator that can also provide a feedback signal for thermo-optical control of the operating wavelength.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A device, comprising:
   a substrate having a surface;
   a first ring waveguide and a second ring waveguide on the surface;
   a first p-doped region inside the first ring waveguide and a second p-doped region inside the second ring waveguide;
   a first n-doped region interposed between the first ring waveguide and the second ring waveguide, a second n-doped region outside the first ring waveguide, a third n-doped region outside the second ring waveguide;
   a first linear waveguide located on the surface adjacent to the first ring waveguide and the second ring waveguide;
   a fourth n-doped region on the surface located adjacent to the first linear waveguide;
   a control circuit configured to modulate light in the first linear waveguide using a voltage source, a first electrical connection to the first p-doped region, a second electrical connection to the second p-doped region, and a third electrical connection to the first n-doped region, and
   a feedback control circuit configured to control a temperature of the first and second ring waveguide, wherein the temperature of the first and second ring waveguides is modified based on a difference between the scattered light detected by a plurality of optical detectors.

2. The device of claim 1, further comprising:
   a second linear waveguide located on the surface adjacent to the first ring waveguide and the second ring waveguide, wherein the second linear waveguide does not overlap with the first linear waveguide,
   wherein the control circuit is further configured to modulate light in the second linear waveguide using the voltage source, the first electrical connection to the first p-doped region, the second electrical connection to the second p-doped region, and the third electrical connection to the first n-doped region.

3. The device of claim 1, wherein the device is operatively connected to a temperature control circuit configured to control a temperature of the first ring wave guide and a temperature of the second ring waveguide.

4. The device of claim 1, wherein the substrate is silicon.

5. The device of claim 1, wherein the first, second, and third n-doped regions do not overlap.

6. The device of claim 1, wherein the first linear waveguide does not overlap with the first n-doped region.

7. The device of claim 1, wherein the fourth n-doped region does not overlap with the first n-doped region.

8. A system for electro-optic modulation of light, the system comprising:
   an electro-optic modulator comprising:
      a substrate having a surface,
      a first ring waveguide and a second ring waveguide on the surface,
      a first p-doped region inside the first ring waveguide and a second p-doped region inside the second ring waveguide,
      a first n-doped region interposed between the first ring waveguide and the second ring waveguide, a second n-doped region outside the first ring waveguide, a third n-doped region outside the second ring waveguide,
      a first linear waveguide located on the surface adjacent to the first ring waveguide and the second ring waveguide,
      a fourth n-doped region on the surface located adjacent to the first linear waveguide, and
      a control circuit configured to modulate light in the first linear waveguide using a voltage source, a first electrical connection to the first p-doped region, a second electrical connection to the second p-doped region, and a third electrical connection to the first n-doped region;
   a temperature control circuit configured to control a temperature in the first ring waveguide and a temperature in the second ring waveguide, and a feedback control circuit configured to control a temperature of the first and second ring waveguide, wherein the temperature of the first and second ring waveguides is modified based on a difference between the scattered light detected by a plurality of optical detectors.

9. The system of claim 8, wherein the plurality of optical detectors compriseses a first optical detector configured to detect the scattered light from the first ring waveguide and a second optical detector for detecting the scattered light from the second ring waveguide.

10. The system of claim 9, wherein the feedback control circuit adjusts the temperature in the first wave guide based on a difference between the scattered light by the first optical detector and the second optical detector.

11. The system of claim 8, wherein the difference is expressed as one selected from a group consisting of positive and negative.

12. The system of claim 8, further comprising:
a first optical detector configured to detect the scattered light from the first ring waveguide;
a second optical detector for detecting the scattered light from the second ring waveguide,
wherein the temperature of the first ring waveguide and the temperature in the second ring is modified by the temperature control circuit based on the scattered light measured by the first optical detector and the second optical detector.

13. The system of claim 8, wherein the first, second, and third n-doped regions do not overlap.

14. The system of claim 13, wherein the first linear waveguide does not overlap with the first n-doped region.

15. The system of claim 14, wherein the fourth n-doped region does not overlap with the first n-doped region.

16. A device, comprising:
a substrate having a surface;
a first ring waveguide and a second ring waveguide on the surface;
a first n-doped region inside the first ring waveguide and a second n-doped region inside the second ring waveguide;
a first p-doped region interposed between the first ring waveguide and the second ring waveguide, a second p-doped region outside the first ring waveguide, a third p-doped region out the second ring waveguide, wherein the first, second, and third p-doped regions do not overlap;
a first linear waveguide located on the surface adjacent to the first ring waveguide and the second ring waveguide, wherein the first linear waveguide does not overlap with the first p-doped region;
a fourth p-doped region on the surface located adjacent to the first linear waveguide, wherein the fourth p-doped region does not overlap with the first p-doped region;
a control circuit configured to modulate light in the first linear waveguide using a voltage source, a first electrical connection to the first n-doped region, a second electrical connection to the second n-doped region, and a third electrical connection to the first p-doped region, and
a feedback control circuit configured to control a temperature of the first and second ring waveguide, wherein the temperature of the first and second ring waveguides is modified based on a difference between the scattered light detected by a plurality of optical detectors.

17. A system for electro-optic modulation of light, the system comprising:
an electro-optic modulator comprising:
a substrate having a surface,
a first ring waveguide and a second ring waveguide on the surface,
a first n-doped region inside the first ring waveguide and a second n-doped region inside the second ring waveguide,
a first p-doped region interposed between the first ring waveguide and the second ring waveguide, a second p-doped region outside the first ring waveguide, a third p-doped region out the second ring waveguide, wherein the first, second, and third p-doped regions do not overlap,
a first linear waveguide located on the surface adjacent to the first ring waveguide and the second ring waveguide, wherein the first linear waveguide does not overlap with the first p-doped region,
a fourth p-doped region on the surface located adjacent to the first linear waveguide, wherein the fourth p-doped region does not overlap with the first p-doped region, and
a control circuit configured to modulate light in the first linear waveguide using a voltage source, a first electrical connection to the first n-doped region, a second electrical connection to the second n-doped region, and a third electrical connection to the first p-doped region;
an optical detector configured to measure optically scattered light from the first ring waveguide and the second ring waveguide;
a temperature control circuit configured to control a temperature in the first ring waveguide and a temperature in the second ring waveguide; and
a feedback control circuit configured to control a temperature of the first and second ring waveguide, wherein the temperature of the first and second ring waveguides is modified based on a difference between the scattered light detected by the plurality of optical detectors.

18. A method for controlling modulation of light, comprising:
measuring optical scattering from a first ring waveguide and a second ring waveguide using an optical detector, wherein the first ring waveguide and the second ring waveguide are located on the same substrate and operatively connected to a control circuit configured to module light in the first ring waveguide;
determining a difference between the optical scattering from the first ring waveguide and the second ring waveguide; and
adjusting a temperature in the first ring waveguide based on the difference.

19. The method of claim 18, further comprising:
adjusting a temperature in the second ring waveguide based on the difference.

20. The method of claim 18, wherein adjusting the temperature is automatic and continuous.

21. The method of claim 18, wherein an electro-optic modulator comprises the first and second ring waveguides.

* * * * *